US012307853B1

(12) United States Patent
Anthony

(10) Patent No.: US 12,307,853 B1
(45) Date of Patent: May 20, 2025

(54) WAGERING GAME TABLE SYSTEMS

(71) Applicant: Thomas Christian Anthony, Melaine, LA (US)

(72) Inventor: Thomas Christian Anthony, Melaine, LA (US)

( * ) Notice: Subject to any disclaimer, the term of this patent is extended or adjusted under 35 U.S.C. 154(b) by 353 days.

(21) Appl. No.: 17/748,265

(22) Filed: May 19, 2022

(51) Int. Cl.
*G07F 17/32* (2006.01)
*H05B 47/115* (2020.01)

(52) U.S. Cl.
CPC ........ *G07F 17/322* (2013.01); *G07F 17/3258* (2013.01); *G07F 17/3276* (2013.01); *H05B 47/115* (2020.01); *G07F 17/3232* (2013.01)

(58) Field of Classification Search
CPC ............. G07F 17/3258; G07F 17/3276; G07F 17/3232
See application file for complete search history.

(56) References Cited

U.S. PATENT DOCUMENTS

| | | | | | |
|---|---|---|---|---|---|
| 9,165,420 | B1 * | 10/2015 | Knust | G07F 17/3232 | |
| 2012/0122559 | A1 * | 5/2012 | Kelly | G07F 17/3239 | 463/25 |
| 2014/0200071 | A1 * | 7/2014 | Czyzewski | G07F 17/3288 | 463/25 |
| 2014/0295948 | A1 * | 10/2014 | Helgesen | G07F 17/322 | 463/25 |
| 2020/0111313 | A1 * | 4/2020 | Guldenaar | G07F 17/322 | |
| 2021/0082226 | A1 * | 3/2021 | Kroupp | G07F 17/3232 | |

* cited by examiner

*Primary Examiner* — Omkar A Deodhar
*Assistant Examiner* — Shauna-Kay Hall
(74) *Attorney, Agent, or Firm* — MARK A. LITMAN & ASSOCIATES, P.A.

(57) ABSTRACT

A bet detection system, which may be combined with other intelligent gaming table technologies and processes to reduce player or dealer error in identifying the status of bets placed on different categories of wagers on a gaming table. At a minimum, a bet recognition system provides at least three separate bet status indications displayed from each single bet recognition unit dedicated to a single wager for a single player. The at least three indications are selected from the group consisting of 1) awaiting bet placement; 2) bet placement made; 3) no bet placed; and 4) position locked.

15 Claims, 3 Drawing Sheets

FIGURE 2

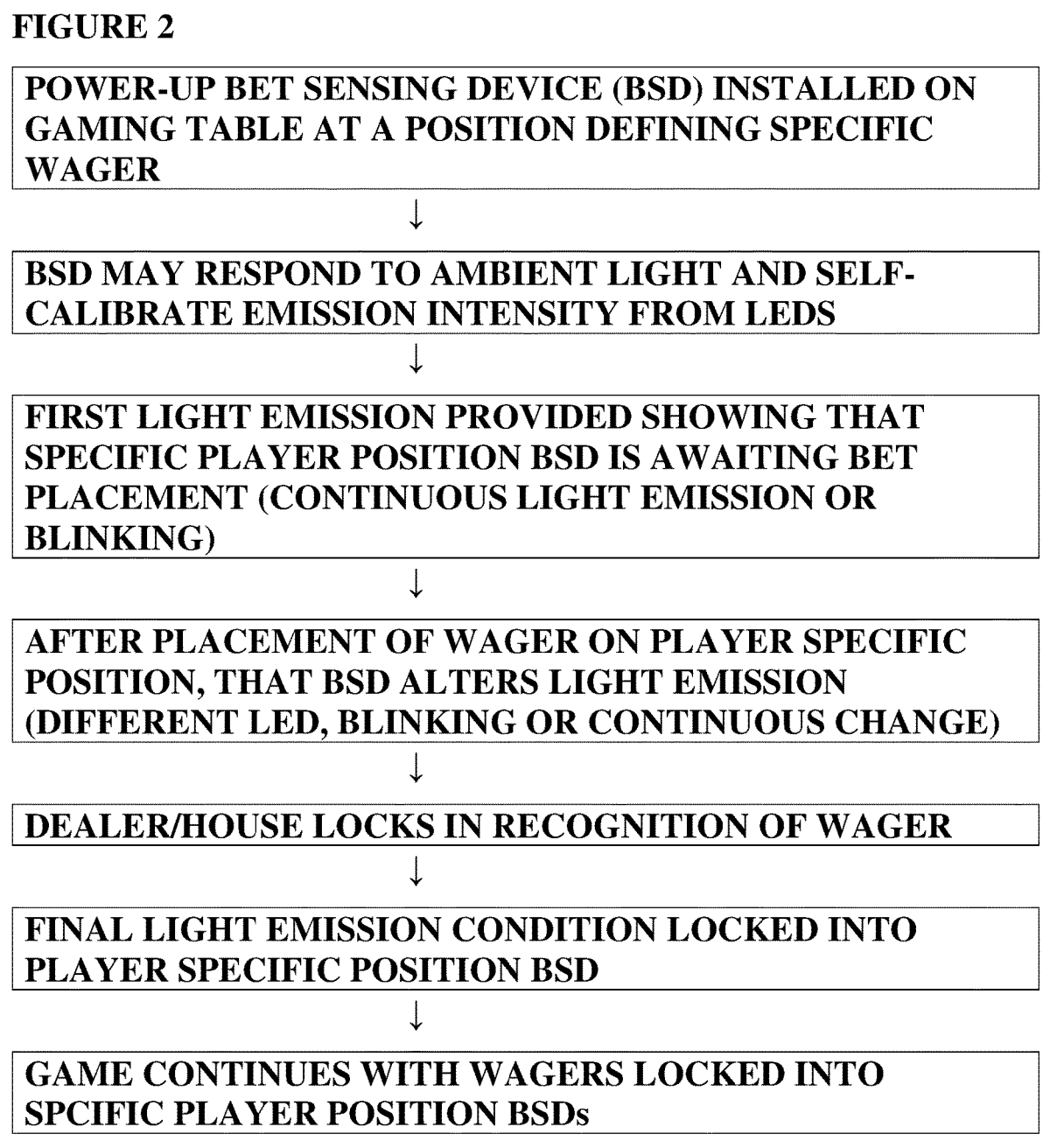

POWER-UP BET SENSING DEVICE (BSD) INSTALLED ON GAMING TABLE AT A POSITION DEFINING SPECIFIC WAGER

↓

BSD MAY RESPOND TO AMBIENT LIGHT AND SELF-CALIBRATE EMISSION INTENSITY FROM LEDS

↓

FIRST LIGHT EMISSION PROVIDED SHOWING THAT SPECIFIC PLAYER POSITION BSD IS AWAITING BET PLACEMENT (CONTINUOUS LIGHT EMISSION OR BLINKING)

↓

AFTER PLACEMENT OF WAGER ON PLAYER SPECIFIC POSITION, THAT BSD ALTERS LIGHT EMISSION (DIFFERENT LED, BLINKING OR CONTINUOUS CHANGE)

↓

DEALER/HOUSE LOCKS IN RECOGNITION OF WAGER

↓

FINAL LIGHT EMISSION CONDITION LOCKED INTO PLAYER SPECIFIC POSITION BSD

↓

GAME CONTINUES WITH WAGERS LOCKED INTO SPCIFIC PLAYER POSITION BSDs

WAGERING GAME TABLE SYSTEMS

RELATED APPLICATION DATA

None.

BACKGROUND OF THE INVENTION

1. Field of the Invention

The present invention relates to the field of gaming tables and particularly playing card gaming tables with wager sensing and information transmission capabilities.

2. Background of the Art

Gaming tables with game-specific printing on their surfaces are standard systems in the gaming industry. These tables are used for many wagering systems, including playing card games, dice games, roulette systems and candy wheel games. The majority of table games are playing card games such as baccarat, blackjack (twenty-one), and poker variants. There can be significant activity and gaming element movement on the playing card gaming tables, including multiple rounds of card movement including multiple cards with each step of game play, card delivery to multiple player positions and a dealer position, wagering chip movement and additions and the like. This complex movement of gaming elements on the game table surface makes automated management and security surveillance of the gaming operation difficult.

Traditionally, betting has been done for centuries with differently colored chips representing different values of currency, typically white for a single unit, red for a five-unit (e.g., dollar) value, green for 25-unit value, etc. Part of the complexity of this wagering is that stacks and bets can be made by combinations of different values of chips and different chips being placed in different locations around a player for antes, bets, raises, side bets, jackpot wagers, and the like. Not only may dealers become confused by these placements, and actually miss seeing placements, but even players can forget to place wagers that had been intended or criminal players may late bet amounts of chips and locations of chips after receiving more advanced information on the progress and relative value of hands at the card table.

Once higher payout bets, such as side bets and jackpots and pot wagers, became more frequent, the need for more security and identification of wagers became more important to casino operators. Even with the "eye-in-the-sky' technology present, skilled cheaters could compromise the integrity of table games. Two of the earliest forms of registering fixed amount jackpot wagers on table games with playing cards were disclosed in Kelly et al U.S. Pat. No. 9,142,084, issued Sep. 22, 2015 and titled "WAGER RECOGNITION SYSTEM," the disclosure of which is incorporated by reference, discloses an optical bet detection unit for a gaming table which can be used to detect a progressive participation wager, and John H. Breeding, U.S. Pat. No. 7,367,884, the disclosure of which is incorporated by reference, relating to a gaming apparatus having a gaming table with a gaming surface providing at least one predetermined location for receiving a gaming token. A gaming token supporter is mounted at each of the at least one predetermined location for receiving a gaming token on the gaming surface of the gaming table such that the gaming token supporter is flush with the gaming surface and forms a gaming token receiving location. A photoelectric sensor for each gaming token supporter that emits and receives modulated radiation is mounted to the gaming table such that each sensor is aligned with and in sensing proximity to a gaming token supporter.

More recent systems have attempted to use RFID chips embedded in distinct wagering chips, or high-definition imaging systems capturing images of individual chips, even when different value and different color chips are combined. Imaging has been done from above the table, on a near parallel plane with the table, or even through the table. Some examples among these types of system are shown with the following disclosures.

U.S. Pat. No. 11,049,362 (Shigeta) discloses a detection system of the present disclosure stores positions and the amount of game tokens that a game participant places on a game table based on a measurement result by a bet chip measuring device in the same persons for each game participant or player positions of the game table. A management control device compares an actual winning rate and a total return amount with figures obtained by a probability statistic calculation at the time of an end of the number of games to determine whether there is a significant difference therebetween and specifies any one of the game participant or the player position, the game table, or a room having the game table where the significant difference is occurring.

Published US Patent Document 20020042298 (Soltys) discloses a system that automatically monitors playing and wagering of a game. A card deck reader automatically reads a symbol identifying a rank and suit from each card in a deck of cards. A chip tray reader automatically images the contents of a chip tray, to periodically determine the number and value of chips in the chip tray, and to compare the change in contents of the chip tray to the outcome of game play for verifying that the proper amounts have been paid out and collected. A table monitor automatically images the activity occurring at a gaming table. Periodic comparison of the images identifies wagering, as well as the appearance, removal and position of cards and other game objects on the gaming table. The system automatically determines the outcome of games, including losses and takes.

U.S. Pat. No. 8,926,421 (Arezina) discloses a multi-player gaming system sensing multiple simultaneous contacts on a surface of a gaming table, differentiating contacts by different players. Privacy controls selectively display private information visible to only one of the players on or near the display surface of the gaming table. The gaming system also detects physical objects placed on the surface of the gaming table, causing wagering game functions or peripheral functions to be performed as a result of the placement of the object on the display surface. The various components of the gaming machine 10 may be connected directly to, or contained within, the housing 12, as seen in FIG. 1A, or may be located outboard of the housing 12 and connected to the housing 12 via a variety of different wired or wireless connection methods. Thus, the gaming machine 10 comprises these components whether housed in the housing 12, or outboard of the housing 12 and connected remotely.

U.S. Pat. No. 5,393,067 (Paulsen) discloses a coin acceptor used in apparatus for automatically sensing the presence of gaming tokens used in cardroom gaming. The Paulsen coin acceptor is a circular disk the under-side of which is placed directly on top of the conventional felt on the table. The disk has a concentric, circular recess in its upper side that is shaped to accept the coin. The outer periphery of the disk is frustoconically shaped and extends from about the under-side of the upper side at an appropriately shallow angle of no more than 30 degrees so that players can readily slide a coin along the felt, up the frustoconical ramp of the disk, and into the recess to place a bet. A coin acceptor of the type disclosed in Paulsen has several problems: (1) inconveniences the dealer when he/she is clearing the table; (2) slows down the number games that may be played in a given period of time, thereby reducing the potential revenue at a particular table; and (3) may reduce the longevity of clay gaming tokens.

U.S. Pat. No. 5,586,936 (Bennett) discloses an automated gaming table tracking system for a gaming table, such as blackjack. A sensor located in the dealer's card playing area senses the start and end of each game. A unique player identity card is given to each player that contains information on the player. When a player arrives at a player position on the table, the player inserts his player identity card into a player station control at the player position. A central distribution control is connected to each player station control for determining the start and the end of each game and beginning and termination of play by each player at each position. A host computer of the present invention is then interconnected to the central distribution control for storing the player identity information and the player position for each player station control, the start and end of each of the games, and the beginning and termination of play at each player position from the central distribution control. The host computer prints a player tracking card. The floor supervisor observes the player during the game and fills out the in-session gaming information. Once the player leaves the table, the player tracking card with the in-session gaming information filled out is then placed in an automatic reader so that the read in-session gaming information is stored in a data base corresponding to the identity of the player.

U.S. Pat. No. 6,186,895 (Oliver) discloses an intelligent casino chip system. At least one gaming table is provided with at least one discrete player area. Each player area has a discrete betting area. Two classes of intermingled gaming chips are accepted in a stack in the discrete betting area. The gaming chip of the first class, comprising the primary wager, has a first transponder containing at least value information. The gaming chip of the second class, comprising the secondary wager, has a second transponder containing value and class information. A transceiver system located on the gaming table within the vicinity of the betting area is used to receive value signals from the first transponder and transponder value and class signals from the second transponder. These signals are conveyed to a computer system that then determines a primary wager value of the primary wager based on the value signals from the first transponder. The computer system also determines the secondary wager value as distinct from the primary wager value based on the value and class signals from the second transponder. Thus, the computer is provided with the respective wager values and the distinct class of the secondary wager when the primary wager and the secondary Published U.S. Patent Document 20170236372 (Bulzacki) discloses systems, methods, devices, and computer readable media for monitoring card game activities at gaming tables, such as for example, counting the number of card hands at gaming tables. The devices may include a sensor array network to detect game events; a microcontroller for running logic level code for checking sensors of the sensors of the sensor array network for pre-defined thresholds defining the detected game events and in response generating game event data; and a connection cable for coupling to a server device for transmitting the game event data. Systems may connect client hardware devices with sensors for monitoring card game activities. A game monitoring server may collect, process and aggregate hand event data received from the client hardware devices to generate hand count data for gaming tables. A front-end interface device may receive notifications relating to hand count data for provision to end user systems.

All documents cited in this filing are incorporated herein by reference in their entirety.

Each of these systems has its strengths and its weaknesses, but tend to be useful for only specific game formats and where actual values of wagers is being determined, still exhibits sufficiently high error rates as to fail to meet desired industry standards.

SUMMARY OF THE INVENTION

A bet detection system, which may be combined with other intelligent gaming table technologies and processes can reduce player or dealer error in identifying the status of bets placed on different categories of wagers on a gaming table, whether with playing card games, dice games, tile games, ball drop games or the like. At a minimum, a bet recognition system provides three separate bet status indications displayed from each single unit dedicated to a single player. The at least three indications are for 1) awaiting bet placement; 2) bet placement made; 3) no bet placed; and 4) position locked.

BRIEF DESCRIPTION OF THE FIGURES

FIG. 2 is a flow diagram explaining the process of using a bet recognition device according to the present invention.

DETAILED DESCRIPTION OF THE INVENTION

Figure 1A:
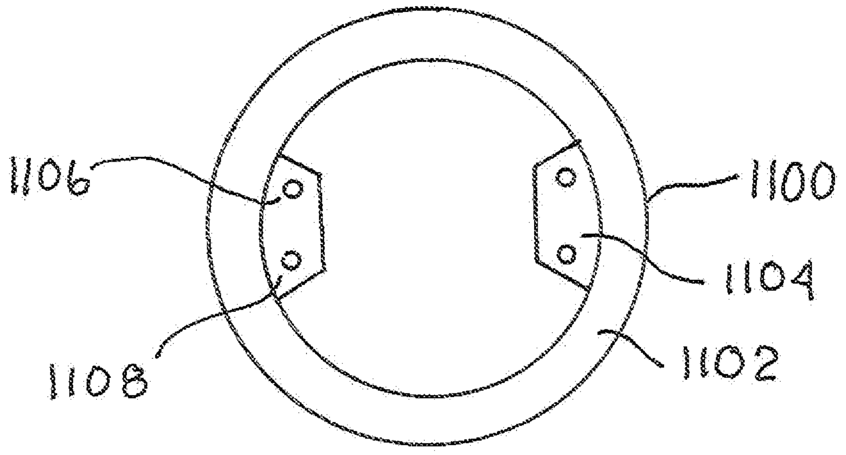
FIG. 1A shows a connection ring that assists in securing the bet recognition device of FIG. 1 to a gaming table.

A bet indicating system includes:

a) a bet sensing element having a housing with a surrounding wall, bottom and at least translucent top forming an enclosure;

b) the enclosure containing a sensor configured to sense the presence of a wagering element placed on the translucent top, two light-emitting elements, a first light-emitting elements emitting a first distinct color when powered, and a second light-emitting element emitting a second distinct color when powered, which second distinct color is visually different from the first distinct color, a communication link to a house control for providing or terminating power to each of the two light-emitting elements, and a connection to a power source for each of the two light-emitting elements;

c) the house control having a control element with an on-off function to:

i) lock in or lock out power to the second light-emitting element and lock in or lock out power to the first light-emitting element; and ii) lock out power to each of the two light-emitting elements.

The bet indicating system is embedded in a gaming table having multiple player positions and a single house position thereon, and there is an electronic house control at the single house position. The bet indicating system has each of the multiple player positions with a bet sensing system. The bet sensing system may be constructed wherein the first color-emitting element emits the first distinct color when no wagering element is present on the translucent surface, and only the second color-emitting element emits the second distinct color when a wagering element is present on the translucent surface.

The bet sensing system may have the house control configured to turn off the first color emitting element when there is no wagering element on the translucent surface and lock in power and color emission from the second color emitting element when a wagering element was sensed on the translucent surface.

The bet sensing system may be configured so that the house control continues power to the first color emitting element when there is no wagering element on the translucent surface and/or lock in power and color emission from the second color emitting element when a wagering element was sensed on the translucent surface.

A method of indicating a lock-in wagering status on a specific wager at a gaming table managed by a house may be performed by:

a) providing a gaming table having multiple player positions thereon;
b) providing a bet sensing system at each of the multiple player positions, the bet sensing systems including;
   i) a bet sensing element comprising a housing with a surrounding wall, bottom and at least translucent top forming an enclosure;
   ii) the enclosure containing a sensor configured to sense the presence of a wagering element placed on the translucent top, two light-emitting elements, a first light-emitting elements emitting a first distinct color when powered, and a second light-emitting element emitting a second distinct color when powered, which second distinct color is visually different from the first distinct color, a communication link to a house control engaging all player positions for providing or terminating power to each of the two light-emitting elements, and a connection to a power source for each of the two light-emitting elements;
   iii) the house control comprising a control element with an on-off function to:
   iii) lock in or lock out power to the second light-emitting element and lock in or lock out power to the first light-emitting element; and
   iv) lock out power to each of the two light-emitting elements;

the method having at least steps of:

first light-emitting elements at each player position are powered, indicating the absence of a wagering element on each translucent top;

at least one player placing a wagering element on a translucent top at that at least one player's position, turning off the first light-emitting element and causing the second light emitting element to emit the second distinct color;

after each of the multiple players has made a final decision to place or not to place a wagering element on their respective translucent tops, the house control is activated to lock in only one lighting condition at each bet sensing system, the lighting conditions at each player position selected from the group consisting of both light-emitting elements off, only one light-emitting element on, and both light-emitting elements on.

The method may have the bet-sensing elements dedicated to placement of wagers on a side bet or a progressive wager in an underlying table game. This method may have steps wherein a bet-sensing element is dedicated to a progressive wager, a signal is sent from the bet-sensing element to a central server that a progressive wager has been made a specific player position, and the central server apportions that progressive wager with at least one portion going into a progressive fund. The method and system may have all distinct colors are selected from the group consisting of red, yellow, green and blue.

Figure 3:
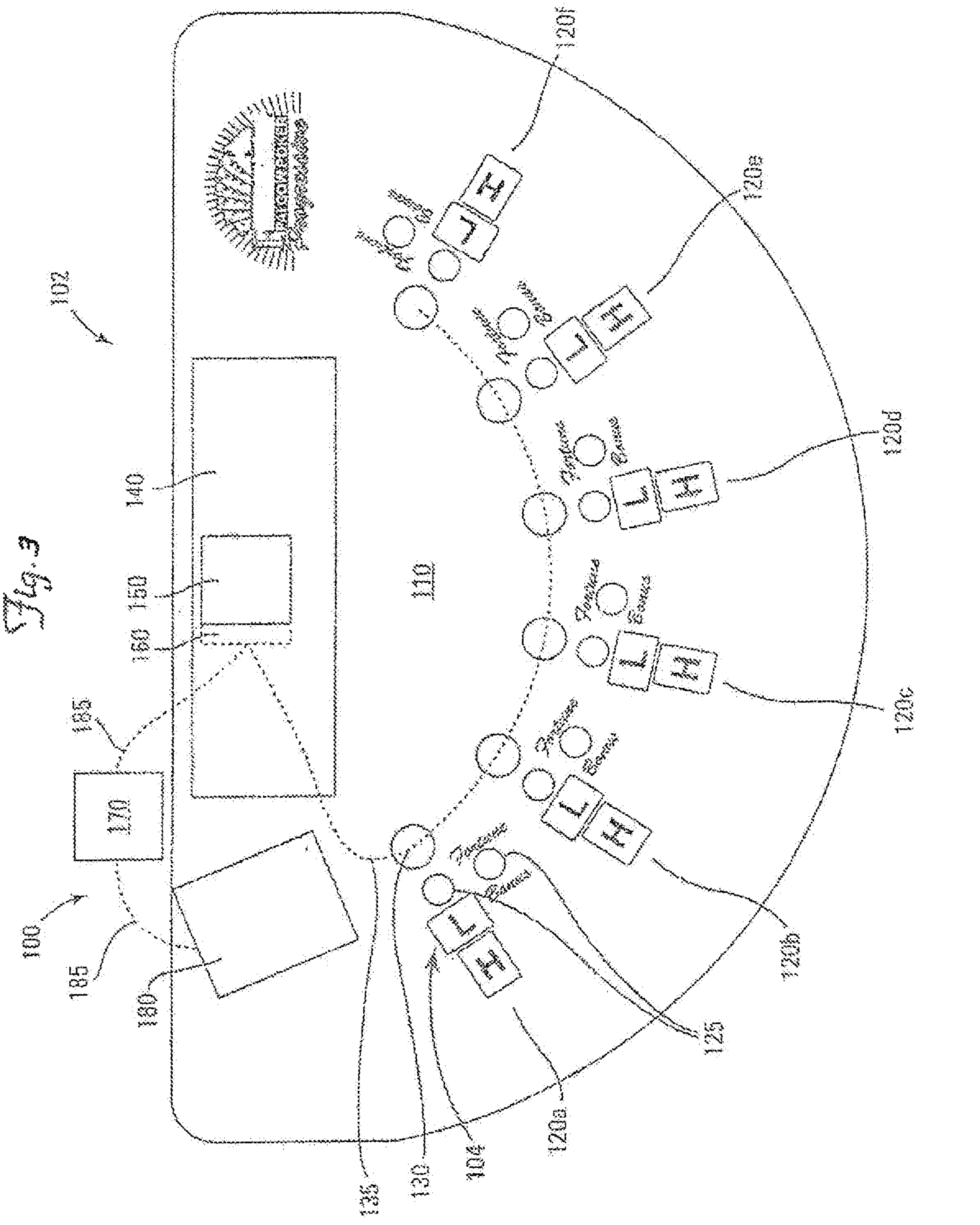
FIG. 3 shows a gaming table with bet recognition devices according to the present invention located at each player position in a Pai Gow table game.

Reference to the figures will further assist in an appreciation of the present technology. FIG. 3 is an exemplary gaming table 102 with a wager sensing system 100. Preferably the wager sensing system 100 senses jackpot wagers. Other examples of the invention sense primary bets, other types of side bets and combinations thereof. The wager sensing system 100 may be used for a progressive jackpot system such as the system disclosed in U.S. Pat. No. 5,794,964 (Jones) or in any other bonus, any other bet, or any other side bet feature system. According to the invention, as in FIG. 3, the gaming table 102 has a gaming table surface 110, preferably a felt surface with indicia thereon identifying elements 104 of the game, such as wager positions and odds. A plurality of player positions **120*a*-120*f* 120*a*-120*f* is disposed on the gaming table 102. Since all player positions 120 are essentially the same, only position 120*a* will be described in detail. Each player position 120 includes wager areas 125 and a bonus bet area, which comprises a token (bet) sensor assembly 130, preferably a progressive wager sensor. Token sensor assemblies 130 are electrically connected in series with wiring 135 or are preferably wireless in communication with the token sensor controller or central or game table processor, shown as a dotted line. While in this example a token sensor assembly 130** is used for sensing only a progressive wager, it is understood that token sensors could be used for any and all wager areas without deviating from the scope of the invention. The preferred embodiment will allow one token sensor assembly for each player position, which player positions will number six or seven on a standard gaming table for games like TEXAS HOLD'EM BONUS™ poker, THREE CARD POKER™ and Pai Gow Poker.

Chip tray 140 is disposed opposite player positions 120. Preferably, chip tray 140 includes an integrated dealer input and display 150 which is part of the dealer terminal. Token sensor controller 160 may be disposed within the housing of the chip tray 140 or within a separate housing mounted under gaming table 102. In this example, token sensor controller 160, shown in phantom, is adjacent the integrated dealer input and display 150, which may have a button or touchscreen function to engage the bet sensing system and lock in wagers. Preferably, token sensor controller 160 includes an FPGA or ASIC, power supply and clock generator and any other desired functions added to enhance the performance of the sensor. The circuit board in each coin sensor assembly contains several simple logic gates but no software runs on the board. These logic gates determine if the assembly is reading or writing to the sensor controller 160. A memory device is also incorporated into the board that responds to a clock pulse from the clock generator. Token sensor controller 160 is electrically connected to token sensor assemblies 130 by serial wiring 135. The system further includes game controller 170 electrically connected to the integrated dealer input and display 150 and token sensor controller 160 by system wiring 185. Preferably, the system also includes card handling device 180, such as a shoe or a shuffler, which is also electrically connected to game controller 170 by system wiring 185. It is further preferred that the shoe or shuffler contain card reading functionality so that cards stored, delivered or withheld have at least one of suit and rank read and that information processed as desired.

The Bet Sensors or bet sensing systems are outfitted with a PC Board as described herein. On this PC Board are components that power the and direct the PC Board on what to do. Some components are capacitors and fuses which regulate and direct the flow of power. Other components are LED lights that are imbedded onto the PC Board and connected to the circuits on the PC Board. A small multi-function sensor in imbedded in the center of the PC Board. This sensor picks up and reads any activity such as light stream, density reading, Photo cell and other types of ways of reading when a bet has been placed on the Bet Indicator. Another component is a small computer board imbedded onto the PC Board. This PC component is a small programmable computer that computer code or software information is uploaded into this PC component to direct the bet indicator or drive the bet indicator system on what to do and how to react when calibrating for surrounding light, auto calibration, accepting and clearing bets, what "state" the bet system is in whether it be bet accepting mode, lock mode, winner mode, jackpot mode, reset mode and so on. This PC component has, by way of non-limiting example, a 4-prong connector attached to the PC Board that is also connected to the PC component that allows for the installation of code and the updating of code as well as retrieving information for diagnostic checks of the bet system and/or a specific Bet Indicator itself. This bet indicator and all others are connected by a string wire that powers the unit. A small connector from the power string wire (male) to the Bet Indicator wire (female) is how the Bet Indicator is connected to the power wire. The power wire is then connected to a power junction box that has a PC Board inside. This PC Board has connectors that the Power Wire connect into as well as a Start/Stop button connector and a Jackpot button connector. When all components are connected to the Power Junction Box, a power wire from the Power Junction Box is connected to a Power Adaptor that plugs into a power outlet. This is how the entire system gets its power. When the system received main power, all Bet indicators and both buttons, Start/Stop and Jackpot bottoms will flash on and off signifying ready to be assign. When the Bet Indicators power up they will flash GREEN then RED then DARK very quickly. This is the self-calibration process that adjusts the sensor to surrounding elements such as light, shadow and other things to perform properly. After the calibration process, the bet indicators will cycle through light colors, GREEN, RED and DARK waiting to be assigned to a specific game, table or task. A setup program built into the software will assign each bet indicator to a specific game and table by the human programmer. By simply activating the light sensor and selecting the game and table in the setup program the process is completed. When the programmer/human completes this function on all bet indicators on a game table, the game table is now ready for play.

Built In PC Board Back Power Wire and Connector is connected to a wire string that plugs into the Power Junction Box. This is how the PC Board Bet Indicator gets power to run the components. The PC Component is a small computer that is uploaded with code and information that tells the Bet Indicator what to do and how to function, what state to be in and send and receive signals and commands to the main system. This process can be completed either by wire connection or wireless connection.

BI PC Board Front LED Lights are the color changing lights imbedded onto the PC Board to signify what state the Bet system is in. Either accepting bets mode, Lock mode, Winner mode, Jackpot mode etc. System Sensor is a small sensor that reads when a bet is placed onto the bet indicator. It will either detect a bet by either light, density, shadow, photo cell or other means of detection. When this sensor is activated it sends a signal to the PC Component to alert that a bet has been made. The PC Component then sends a signal to the main system and the main system runs the correct procedure to increment a jackpot meter as well as divide the bet amount and send the appropriate amounts to each holding cell or bucket for each payouts and profits. Upload Connector Pins are where a connector is placed to upload new information to the PC Component. An upload using these pins program the individual BI with the correct program and code to function as it is supposed to.

The Power Junction Box is where the Game Button, Jackpot Button and all Bet Indicators plug into the receive power to operate. Game Buttons: Game Start/Stop Button is pressed and is lit RED to lock in game mode and lock out bets and start a round of game play. It is pressed once again and is lit GREEN to unlock game mode and allow for new bets. This also tells the main system what state the game mode is in and to do the appropriate commands to log information from one game mode to another.

The components may be provided on the game table according to FIG. 1A within a canister which is inserted directly into a hole on the table. By having a wireless communication system, the individually named and identifiable bet sensing systems may be plugged into the hole (with self-powering or connection to a power connector) and automatically connects with the table game controller or central server without having to connect a whole wired communication system.

Figure 1B:
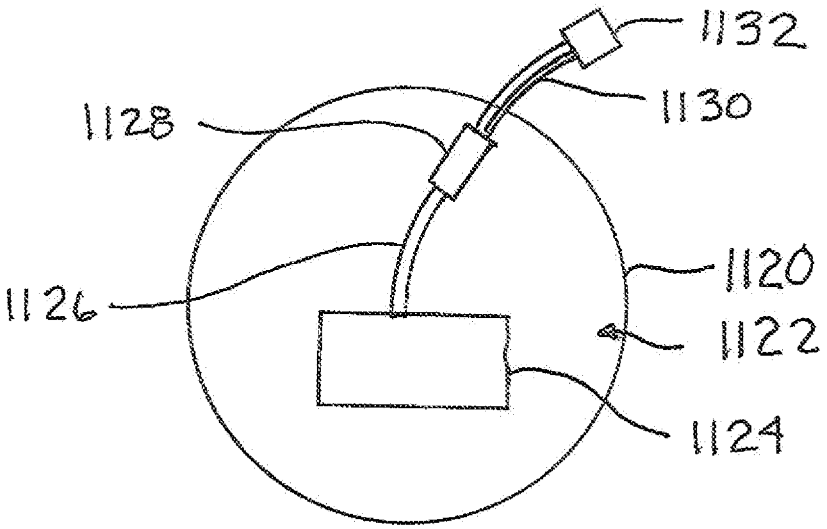
FIG. 1B shows ma Built-In (BI) PC Board Front, with multiple color LED Lights which are the color changing lights imbedded onto the PC Board.
Figure 1C:
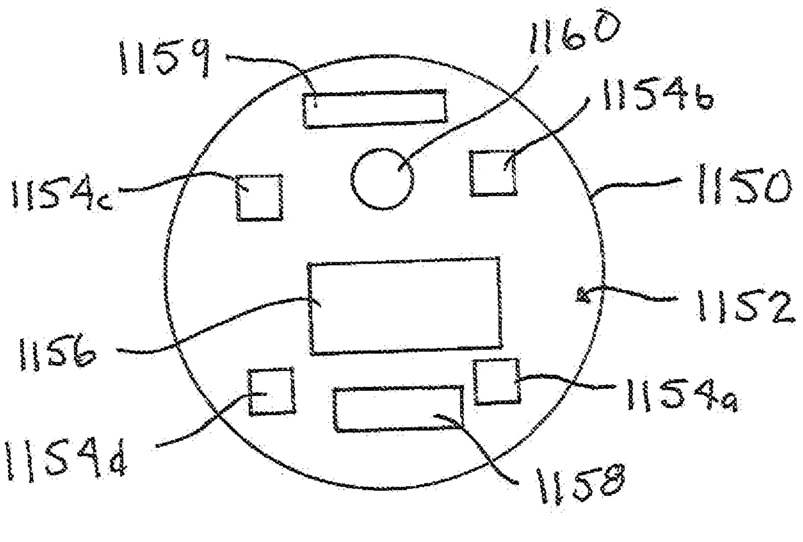
FIG. 1C shows a Built-In PC Board Back, with a Power Wire and Connector connected to a wire string that plugs into the Power Junction Box (not shown).

FIG. 1A shows a connection ring 1100 that assists in securing the bet recognition device of FIGS. 1A, 1B and 1C to a gaming table (not shown). The connection ring 1100 is shown with a circular body 1102, a connection plate 1104, and hole 1106 for assisting connection to a table surface and hole 1108 for allowing wired connections through the connection plate 1104.

FIG. 1B shows a Built-In PC Board Back 1120, with a Power Wire 1126 and Connector 1128 connected to a two-strand wire string 1130 that plugs into an end connector 1132 which in turn will be connected into a Power Junction Box (not shown).

FIG. 1C shows a front view of Built-In (BI) PC Board Front 1150, with a support surface 1152, carrying, for example, four different color-emitting multiple color LED Lights 1154a, 1154b, 1154c and 1154d which are the color changing lights imbedded into or secured onto the PC Board surface 1152. The system sensor 1160 is shown, which may also contain an optional environmental light sensor, which optional light sensor responds to ambient light coming into the bet recognition device from the surrounding environment. The sensed environment light is used by processors in the bet recognition device (such as processing or logic elements 1158 and 1159). Logic elements may be Filed Programmable Gated Arrays or Application Specific Intelligent Chips (FPGAs or ASICs) or may be processing boards containing minicomputers, microprocessors with firmware or software giving process direction to the operation and responses of the bet recognition device.

FIG. 2 is a flow diagram explaining the process of using a bet recognition device according to the present invention.

When the bet sensors are powered on, they each may automatically self-calibrate to adjust for surrounding light to appropriately illuminate and not have any interference of outside light sources. Once calibrated they may blink different colors in the "ready" mode or give some other visually specific emission patterns to be assigned to a game. Running in the game configuration mode, a bet sensor will be assigned to a specific table by simply running the configuration mode, placing a chip on the bet sensor and waiting for the system to accept the bet sensor. This will be done for each bet sensor until all sensors have been calibrated for a specific table. Once a bet sensor is activated it is ready to accept bets for game play. Once all bet sensors have been activated the table is ready for repeated or continuous game play.

Each bet sensor will have its own ID or IP address that communicates with or within the system vie wire or wireless connection. This method of bet sensor allows for unlimited numbers of bet sensors to be placed on a single table or used at the same time.

There are alternative methods and steps that may be used with the apparatus of the present invention. Not only can lights be used to show when a bet has been made or not, the sensor(s) in the bet detection system way be partnered with a LED video screen to fit inside the bet sensor housing under a translucent top to play a video and have a video screen show when there is a bet or now bet, or even provide gaming event information. The video screen can also play videos of promotions, commercials, enticement to play the game and other videos that may attract attention or boost business. An LED video screen may replace everything that the LED lights do and more to advertise at each betting sensor. The different net sensing system can all play the same video or each play different videos.

The system may also contain unique firmware, source code and code description. The firmware and/or code written for the bet sensors may include functionality as follows:

Each bet sensor is uploaded with its own firmware and code to make each BSD run as it should within the system. When a small sensor (e.g., located in the center of the PC Board of the BSD) is triggered, that triggering sets into motion the many lines of code and/or firmware in a predetermined order that deploys the BSD what to do step by step. This can include steps as follows:

1. Sensor triggered by a betting element
2. Code/firmware triggers LED light or flat video screen on the PC Board of the BSD to respond with the correct response.
3. Dealer will press the Start/Stop button located on the table top to "Lock" all bets in place for the round of play.
4. The code/Firmware will respond to the "Lock" command and set another response in motion.
5. All BSD's with bets will Illuminate with a specific light color or pattern or with a specific video light or video to signify a bet is locked in and in play.
6. All BSD's that had no bets will receive a command from the BSD code/firmware to de-illuminate or turn off power to the BSD device.
7. The code/firmware of the BSD will communicate with the mainframe computer that holds the accounting software that accepts the bet amount and allocated a fraction of the bet amount to different areas of the accounting system for appropriate payouts and adds incremented amounts to a single or multiple jackpot.
8. If there are no winners in the round of play the Start/Stop button is pressed again the this exits the previous game mode and opens a new game mode to accept betting.
9. This sends a message to the mainframe CPU to start a new cycle of game play mode and record the previous game into the memory archives for future reporting.
10. If a jackpot is encountered during game play mode, the dealer will press the jackpot button and this will send an alert to the mainframe system to enter jackpot process mode.
11. A pop-up will appear on the computer screen asking for appropriate credentials to enter jackpot pay mode.
12. The manager will enter jackpot pay mode and accept the jackpot by pressing the appropriate response or cancel the jackpot and return to game play mode.
13. System reporting is done when a user enters reporting mode on the mainframe computer.
14. User can check a specific date range or a predetermined date range to look at player usage, jackpot payouts, errors, and any other source of interest of the user.
15. Reporting will also be done through an automatic email send to each user that is input into the system. The reports will be generated automatically and sent daily, weekly, monthly, quarterly, yearly as the user requires.
16. The system will also be equipped to send reports back to the programmers to alert when there is a corruption or error within the system that needs to be addressed and/or fixed. The system will let the programmers know when it is sick.

The invention may be practiced using equipment and methods as generally described below:

A bet indicating system my include:

a) a bet sensing element comprising a housing with a surrounding wall, bottom and at least translucent top forming an enclosure;

b) the enclosure containing a sensor configured to sense the presence of a wagering element placed on the translucent top, two light-emitting elements, a first light-emitting elements emitting a first distinct color when powered, and a second light-emitting element emitting a second distinct color when powered, which second distinct color is visually different from the first distinct color, a communication link to a house control for providing or terminating power to each of the two light-emitting elements, and a connection to a power source for each of the two light-emitting elements;

c) the house control comprising a control element with an on-off function to:

i) lock in or lock out power to the second light-emitting element and lock in or lock out power to the first light-emitting element; and ii) lock out power to each of the two light-emitting elements.

The bet indicating system may include the bet sensing element is embedded in a gaming table having multiple player positions and a single house position thereon, and there is an electronic house control at the single house position. Each of the multiple player positions may have a bet sensing system. The first color-emitting element may emit the first distinct color when no wagering element is present on the translucent surface, and only the second color-emitting element emits the second distinct color when a wagering element is present on the translucent surface. The bet sensing system may have the first color-emitting element emit the first distinct color when no wagering element is present on the translucent surface, and only the second color-emitting element emits the second distinct color when a wagering element is present on the translucent surface. The bet sensing system may have the house control configured to turn off the first color emitting element when there is no wagering element on the translucent surface and lock in power and color emission from the second color emitting element when a wagering element was sensed on the translucent surface.

The bet sensing system may have the house control is configured to continuing power to the first color emitting element when there is no wagering element on the translucent surface and lock in power and color emission from the second color emitting element when a wagering element was sensed on the translucent surface.

A method of indicating a lock-in wagering status on a specific wager at a gaming table managed by a house may include steps such as the following:

a) providing a gaming table having multiple player positions thereon;
b) providing a bet sensing system at each of the multiple player positions, the bet sensing systems comprising;
  i) a bet sensing element comprising a housing with a surrounding wall, bottom and at least translucent top forming an enclosure;
  ii) the enclosure containing a sensor configured to sense the presence of a wagering element placed on the translucent top, two light-emitting elements, a first light-emitting elements emitting a first distinct color when powered, and a second light-emitting element emitting a second distinct color when powered, which second distinct color is visually different from the first distinct color, a communication link to a house control engaging all player positions for providing or terminating power to each of the two light-emitting elements, and a connection to a power source for each of the two light-emitting elements;
  iii) the house control comprising a control element with an on-off function to:
  v) lock in or lock out power to the second light-emitting element and lock in or lock out power to the first light-emitting element; and
  vi) lock out power to each of the two light-emitting elements;

the method comprising:

first light-emitting elements at each player position are powered, indicating the absence of a wagering element on each translucent top;

at least one player placing a wagering element on a translucent top at that at least one player's position, turning off the first light-emitting element and causing the second light emitting element to emit the second distinct color;

after each of the multiple players has made a final decision to place or not to place a wagering element on their respective translucent tops, the house control is activated to lock in only one lighting condition at each bet sensing system, the lighting conditions at each player position selected from the group consisting of both light-emitting elements off, only one light-emitting element on, and both light-emitting elements on.

The method may be used where the bet-sensing elements are dedicated to placement of wagers on a side bet or a progressive wager in an underlying table game.

The method may be used wherein when a bet-sensing element is dedicated to a progressive wager, a signal is sent from the bet-sensing element to a central server that a progressive wager has been made a specific player position, and the central server apportions that progressive wager with at least one portion going into a progressive fund.

The method may be practiced wherein all distinct colors are selected from the group consisting of red, yellow, green and blue or various shades thereof, along or without a white light emitting LED.

Additional steps and features can be used in the performance of the present technology without deviating from the scope of the claims provided below. For example, even though specific colors have been identified for each LED, alternative colors and sizes may be used. The bet sensing devices are typically from 1 inches to 4.0 inches in diameter, but that size may be varied as desired by the designer.

What is claimed:

1. A bet indicating system comprising:
a) a bet sensing element comprising a housing with a surrounding wall, bottom and at least translucent top forming an enclosure;
b) the enclosure containing a sensor configured to sense the presence of a wagering element placed on the translucent top,
c) at least two light-emitting elements, a first of the at least two light-emitting elements emitting a first distinct color when powered, and
d) a second light emitting element emitting a second distinct color when powered, which second distinct color is visually different from the first distinct color,
e) a communication link to a house control for providing or terminating power to each of the at least two light emitting elements, and
f) a connection to a power source for each of the two light-emitting elements;
g) the house control comprising a control element with an on-off function to:
  i) lock in or lock out power to the second light-emitting element and lock in or lock out power to the first light emitting element; and
  ii) lock out power to each of the two light-emitting elements; and wherein the at least two light-emitting elements are configured provide at least three different color combination indications selected from the group consisting of 1) awaiting bet placement; 2) bet placement made; 3) no bet placed; and 4) position locked.

2. The bet indicating system of claim 1, wherein the bet sensing element is embedded in a gaming table having multiple player positions and a single house position thereon, and there is an electronic house control at the single house position and wherein the at least two displays provide at least three indications for 1) awaiting bet placement; 2) bet placement made; 3) no bet placed; and 4) position locked.

3. The bet indicating system of claim 2 wherein each of the multiple player positions has a bet sensing system.

4. The bet indicating system of claim 1 wherein the first color emitting element emits the first distinct color when no wagering element is present on the translucent surface, and only the second color-emitting element emits the second distinct color when a wagering element is present on the translucent surface.

5. The bet indicating system of claim 2 wherein the first color emitting element emits the first distinct color when no wagering element is present on the translucent surface, and only the second color-emitting element emits the second distinct color when a wagering element is present on the translucent surface.

6. The bet indicating system of claim 4 wherein the house control is configured to turn off the first color emitting element when there is no wagering element on the translucent surface and lock in power and color emission from the second color emitting element when a wagering element was sensed on the translucent surface.

7. The bet indicating system of claim 4 wherein the house control is configured to continuing power to the first color emitting element when there is no wagering element on the translucent surface and lock in power and color emission from the second color emitting element when a wagering element was sensed on the translucent surface.

8. The bet indicating system of claim 1, wherein the bet sensing element is embedded in a gaming table having multiple player positions and a single house position thereon, and there is an electronic house control at the single house position and wherein the at least two displays provide at least three indications for 1) awaiting bet placement; 2) bet placement made; 3) no bet placed; and 4) position locked.

9. The bet indicating system of claim 8, wherein the bet sensing element is embedded in a gaming table having multiple player positions and a single house position thereon, and there is an electronic house control at the single house position and wherein the at least two displays provide at least three indications for 1) awaiting bet placement; 2) bet placement made; 3) no bet placed; and 4) position locked.

10. A method of indicating a lock-in wagering status on a specific wager at a gaming table managed by a house comprising:

a) providing a gaming table having multiple player positions thereon;

b) providing a bet sensing system at each of the multiple player positions, the bet sensing systems comprising;

i) a bet sensing element comprising a housing with a surrounding wall, bottom and at least translucent top forming an enclosure;

ii) the enclosure containing a sensor configured to sense the presence of a wagering element placed on the translucent top, two light-emitting elements, a first light-emitting elements emitting a first distinct color when powered, and a second light-emitting element emitting a second distinct color when powered, which second distinct color is visually different from the first distinct color, a communication link to a house control engaging all player positions for providing or terminating power to each of the two light-emitting elements, and a connection to a power source for each of the two light-emitting elements;

iii) the house control comprising a control element with an on-off function to:

iv) lock in or lock out power to the second light-emitting element and lock in or lock out power to the first light emitting element; and viii) lock out power to each of the two light-emitting elements;

the method comprising:

first light-emitting elements at each player position are powered, indicating the absence of a wagering element on each translucent top;

at least one player placing a wagering element on a translucent top at that at least one player's position, turning off the first light-emitting element and causing the second light emitting element to emit the second distinct color;

after each of the multiple players has made a final decision to place or not to place a wagering element on their respective translucent tops, the house control is activated to lock in only one lighting condition at each bet sensing system, the lighting conditions at each player position selected from the group consisting of both light-emitting elements off, only one light-emitting element on, and both light-emitting elements on.

11. The method of claim 10 wherein the bet-sensing elements are dedicated to placement of wagers on a side bet or a progressive wager in an underlying table game.

12. The method of claim 11 wherein when a bet-sensing element is dedicated to a progressive wager, a signal is sent from the bet-sensing element to a central server that a progressive wager has been made a specific player position, and the central server apportions that progressive wager with at least one portion going into a progressive fund.

13. The method of claim 12 wherein the at least two light-emitting elements are configured to provide at least three different color combination indications selected from the group consisting of 1) awaiting bet placement; 2) bet placement made; 3) no bet placed; and 4) position locked.

14. The method of claim 11 wherein all distinct colors are selected from the group consisting of red, yellow, green and blue.

15. The method of claim 11 wherein the at least two light-emitting elements are configured to provide at least three different color combination indications selected from the group consisting of 1) awaiting bet placement; 2) bet placement made; 3) no bet placed; and 4) position locked.

* * * * *